(12) United States Patent
Fleischer et al.

(10) Patent No.: US 9,413,417 B2
(45) Date of Patent: Aug. 9, 2016

(54) APPARATUS FOR IMPROVING RECEIVER SENSITIVITY IN A COMMUNICATION SYSTEM

(71) Applicant: Nokia Solutions and Networks Oy, Espoo (FI)

(72) Inventors: Marko Fleischer, Unterhaching (DE); Helmut Heinz, Türkheim (DE); Thomas Klink, Ottobrunn (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/566,883

(22) Filed: Dec. 11, 2014

(65) Prior Publication Data

US 2015/0171902 A1     Jun. 18, 2015

(30) Foreign Application Priority Data

Dec. 12, 2013  (EP) ..................... 13196875

(51) Int. Cl.
| | |
|---|---|
| *H04B 1/00* | (2006.01) |
| *H04B 1/525* | (2015.01) |
| *H04B 1/12* | (2006.01) |
| *H04L 27/36* | (2006.01) |

(52) U.S. Cl.
  CPC ............... *H04B 1/525* (2013.01); *H04B 1/123* (2013.01); *H04L 27/366* (2013.01)

(58) Field of Classification Search
  CPC ....... H04B 1/525; H04B 1/123; H04L 27/366
  See application file for complete search history.

(56) References Cited

U.S. PATENT DOCUMENTS

| | | | | |
|---|---|---|---|---|
| 8,890,619 B2* | 11/2014 | Wyville | .................. | H04B 1/109 327/156 |
| 2007/0184782 A1* | 8/2007 | Sahota | .................... | H04B 1/525 455/63.1 |
| 2008/0089397 A1* | 4/2008 | Vetter | .................... | H04L 27/366 375/220 |
| 2012/0140860 A1 | 6/2012 | Rimini et al. | .................. | 375/350 |
| 2012/0295558 A1 | 11/2012 | Wang et al. | ..................... | 455/79 |
| 2013/0044791 A1* | 2/2013 | Rimini | ................... | H04B 1/109 375/219 |
| 2013/0194938 A1* | 8/2013 | Immonen | ............... | H04B 1/525 370/252 |
| 2015/0111515 A1* | 4/2015 | Su | ........................ | H04B 1/1027 455/295 |

OTHER PUBLICATIONS

Giuseppe Macchiarella, et al.; "Experimental Study of Passive Intermodulation in Coaxial Cavities for Cellular Base Stations Duplexers"; Microwave Conference, 2004. 34th European Amsterdam, The Netherlands Oct. 13, 2004, Piscataway, NJ, USA,IEEE, vol. 2, Oct. 13, 2004, pp. 981-984, XP010785057, (4 pages).

* cited by examiner

*Primary Examiner* — Sophia Vlahos
(74) *Attorney, Agent, or Firm* — Harrington & Smith

(57) ABSTRACT

A method including capturing a signaling on a transmission path conveying a signal to be transmitted and on a reception path conveying a signal being received, setting model parameters related to a distortion effect on the basis of the captured signaling, the distortion effect being caused by the signal to be transmitted on the signal being received due to passive intermodulation between the transmission path and the reception path, generating a reference signal being related to a predetermined frequency spectrum part used by the signal being received by applying the model parameters on a captured signaling on the transmission path, and correcting the signal being received by using the generated reference signal.

1 Claim, 10 Drawing Sheets

APPARATUS FOR IMPROVING RECEIVER SENSITIVITY IN A COMMUNICATION SYSTEM

CROSS REFERENCE TO A RELATED APPLICATION

This application claims the benefit of European Patent Application No. EP13196875, filed Dec. 12, 2013, the disclosure of which is incorporated herein by reference in its entirety.

BACKGROUND

1. Field

The present invention relates to apparatuses, methods, systems, computer programs, computer program products and computer-readable media usable for improving a sensitivity of a receiver in a communication system.

2. Background Art

The following description of background art may include insights, discoveries, understandings or disclosures, or associations, together with disclosures not known to the relevant art prior, to at least some examples of embodiments of the present invention but provided by the invention. Some such contributions of the invention may be specifically pointed out below, whereas other such contributions of the invention will be apparent from their context.

The following meanings for the abbreviations used in this specification apply:
ADC: analogue to digital converter
ASIC: application specific integrated circuit
BS: base station
BW: bandwidth
CPU: central processing unit
DAC: digital to analogue converter
DFE: digital front end
DSP: digital signal processor
eNB: evolved node B
EVM: error vector magnitude
FDD: frequency division duplex
FIR: finite impulse response
FPGA: field programmable gate array
GSM: global systems for mobile communications
HW: hardware
ID: identification, identifier
LNA: low noise amplifier
LTE: long term evolution
LTE-A: long term evolution advanced
PA: power amplifier
PIM: passive intermodulation product
RF: radio frequency
RX: reception, receiver
SW: software
TX: transmission, transmitter
TXRX: transmitter to receiver
UE: user equipment
WCDMA: wireless code division multiple access Generally, for properly establishing and handling a communication connection between communication entities, such as terminal devices, user devices or user equipment (UE), and other communication entities, such as network elements, user devices, a database, a server, host etc., one or more intermediate network entities, such as communication network control elements, base stations, control nodes, support nodes, service nodes etc., are involved which may belong to different communication network. The communication entities, network entities etc. comprise one or more communication functions or elements operating for transmitting and receiving signaling exchanged between communication/network entities involved in a communication, such as transmitter-receiver systems, transceiver systems combining both transmitter and receiver functions or elements, transponder systems etc. That is, transmission and reception of signaling e.g. via an air interface is conducted in parallel in communication/network entities on plural carriers, for example.

However, the parallel operation of receiver and transmitter systems may cause interferences which may limit in particular the sensitivity on receiver side. For example, when considering e.g. a high power broadband multi-standard multi-carrier FDD system, it is possible that the system performance and sensitivity is affected by transmitter induced intermodulation products falling into the receive band, i.e. at RX channels. Due to the in-band nature of such distortions, it is not possible to use conventional filter technique to improve receiver sensitivity.

The likelihood of having a receiving channel being polluted by an own transmitter is increasing with new wireless communication schemes, such as broadband multicarrier BTS architectures simultaneously supporting a combination of plural communication systems, such as a combination of LTE/WCDMA/GSM.

SUMMARY

According to some aspects of the invention, there is provided, for example, a method comprising capturing a signaling on a transmission path conveying a signal to be transmitted and on a reception path conveying a signal being received, setting model parameters related to a distortion effect on the basis of the captured signaling, the distortion effect being caused by the signal to be transmitted on the signal being received due to passive intermodulation between the transmission path and the reception path, generating a reference signal being related to a predetermined frequency spectrum part used by the signal being received by applying the model parameters on a captured signaling on the transmission path, and correcting the signal being received by using the generated reference signal.

Furthermore, according to some aspects of the invention, there is provided, for example, an apparatus comprising at least one processor, and at least one memory for storing instructions to be executed by the processor, wherein the at least one memory and the instructions are configured to, with the at least one processor, cause the apparatus at least: to capture a signaling on a transmission path conveying a signal to be transmitted and on a reception path conveying a signal being received, to set model parameters related to a distortion effect on the basis of the captured signaling, the distortion effect being caused by the signal to be transmitted on the signal being received due to passive intermodulation between the transmission path and the reception path, to generate a reference signal being related to a predetermined frequency spectrum part used by the signal being received by applying the model parameters on a captured signaling on the transmission path, and to correct the signal being received by using the generated reference signal.

Moreover, according to some aspects of the invention, there is provided, for example, an apparatus comprising a link to at least one transmission path for conveying a signal to be transmitted, a link to at least one reception path for conveying a signal being received, a data capturing unit configured to capture a signaling on a transmission path conveying a signal to be transmitted and on a reception path conveying a signal being received, a reference signal generation unit configured to set model parameters related to a distortion effect on the basis of the captured signaling, the distortion effect being caused by the signal to be transmitted on the signal being received due to passive intermodulation between the transmission path and the reception path, and to generate a reference signal being related to a predetermined frequency spectrum part used by the signal being received by applying the model parameters on a captured signaling on the transmission path, and a correction unit configured to correct the signal being received by using the generated reference signal.

According to some further refinements, some aspects of the invention are related to at least one of the following features:

the correcting of the signal being received may include a subtraction processing of the reference signal from a main reception signal being affected by the distortion effect;

a part of the captured signaling which is used for setting the model parameters may be captured as digital data conveyed in the transmission path before a digital-to-analog conversion and a power amplification of the signal to be transmitted are conducted, wherein the setting of the model parameters may further comprise conducting an identifying process for deriving the model parameters determining a non-linear modelling, wherein the reference signal is generated on the basis of the derived model parameters related to the passive intermodulation in time and magnitude via a finite impulse response filter;

the setting of the model parameters may further comprise conducting an identifying process for deriving the model parameters related to a distortion effect being caused by the signal to be transmitted on the signal being received due to a characteristic of a connection element including at least one of a duplexer or combiner, wherein the reference signal is generated on the basis of the derived model parameters related to the passive intermodulation and to the characteristic of the connection element in time and magnitude via a respective finite impulse response filter;

a part of the captured signaling which is used for setting the model parameters may be captured as analogue data conveyed in the transmission path after a digital-to-analog conversion and a power amplification of the signal to be transmitted are conducted, wherein the analogue data are subjected to the distortion effect, wherein the process may further comprise supplying the captured signaling to a radio frequency feedback receiver, supplying the output of the radio frequency feedback receiver to a non-linear processing element for generating the reference signal, wherein the processing of the non-linear processing element is based on the set model parameters, wherein the setting of the model parameters may comprise conducting an identifying process for deriving the model parameters determining a non-linear modelling;

a part of the captured signaling which is used for setting the model parameters may be captured as analogue data conveyed in the transmission path after a digital-to-analog conversion and a power amplification of the signal to be transmitted are conducted, wherein the analogue data are subjected to the distortion effect, wherein the process may further comprise supplying the captured signaling to an artificial passive intermodulation source emulating the distortion effect, supplying the output of the artificial passive intermodulation source to a radio frequency feedback receiver, supplying the output of the radio frequency feedback receiver to a processing element for generating the reference signal, wherein the processing of the processing element may be based on the set model parameters;

the artificial passive intermodulation source may be an adjustable non-linear analogue circuit having a characteristic allowing a dynamic gain matching with a source of the distortion effect;

in case plural transmission paths are provided, the signaling may be a combined analogue transmission signal being captured after a combining stage combining the plural transmission paths;

the procedures may be implemented in a transceiver entity comprising at least one antenna, at least one transmission path and at least one reception path.

In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some example versions of the disclosure and embodiments are described below, by way of example only, with reference to the accompanying drawings, in which.

DESCRIPTION OF EMBODIMENTS

Figure 1:
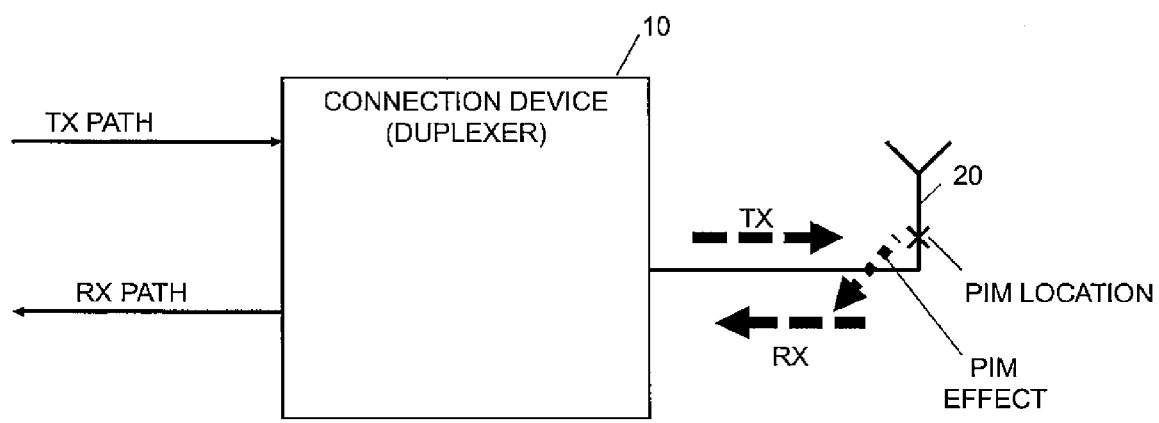
FIG. 1 shows a diagram illustrating a part of a transceiver element used in a communication scenario where some example versions of the disclosure can be applied.

In the following, some embodiments or example versions of the disclosure are described with reference to the drawings. In the following, different embodiments will be described using a communication element, such as a transceiver element as an example which is used, for example, in a communication conducted e.g. in a wireless communication network, such as an LTE based network. However, it is to be noted that example versions of the disclosure are not limited to an application using such types of communication elements or communication system, but they are also applicable in other types of communication elements and systems, and the like.

The following embodiments and example versions of the disclosure are only illustrative examples. Although the specification may refer to "an", "one", or "some" example version of the disclosure in several locations, this does not necessarily mean that each such reference is to the example version(s), or that the feature only applies to a single example version. Single features of different example versions may also be combined to provide other example versions. Furthermore, words "comprising" and "including" should be understood as not limiting the described example versions of the disclosure to consist of only those features that have been mentioned and such example versions may also contain also features, structures, units, modules etc. that have not been specifically mentioned.

A basic system architecture of a communication system where examples of embodiments are applicable may comprise a commonly known architecture of one or more communication networks comprising a wired or wireless access subsystem. Such an architecture may consist of plural communication elements comprising e.g. one or more communication network control elements, access network elements, radio access network elements, access service network gateways or base transceiver stations, such as a base station, an access point or an eNB, which control a respective coverage area or cell and with which one or more communication elements like terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised. It is assumed that at least one of the communication elements involved in a communication comprises a component or function allowing a transmission and reception of data where a distortion caused by a signaling on a transmission path affects the sensitivity of a receiver path or chain.

The general functions and interconnections of described elements, which also depend on the actual network configuration, are known to those skilled in the art, so that a detailed description thereof is omitted herein. However, it is to be noted that several additional elements, functions or devices and signaling links may be employed for transmitting and receiving a signaling related to a communication to or from a communication element comprising a transmitting and receiving (transceiver) element or function besides those described in detail herein below.

A communication network in which example versions of the disclosure are applicable for increasing a sensitivity of a receiver in a communication element may communicate via wireless and/or wired communication paths of a public switched telephone network, a local area network, the Internet, etc. It should be appreciated that communication elements using a transmitting and receiving function or the like, such as terminal devices, UEs, access points, eNBs etc., or their functionalities may be implemented by using any node, host, server, access node etc. or entity suitable for such a usage.

Furthermore, the described communication elements, such as terminal devices, user devices like UEs, communication network control elements, like an eNB, access network elements and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

As described above, system performance of a communication element with regard to receiver sensitivity may be affected by distortions caused by a TX path, e.g. by transmitter induced intermodulation products landing at an RX frequency band.

Receivers, and in particular broadband receivers, are vulnerable with respect to passive intermodulation products (PIM). This may lead to a reduced signal-to-noise and interference relationship of receive channels and may results in throughput degradations or insufficient receiver data quality.

It is to be noted that in the following the term PIM, "passive intermodulation products" or distortion is used as an overall terminology describing intermodulation effects caused, for example, within an antenna network. PIM may originate from a variety of physical effects and is unavoidable in practical antenna systems.

Non-linear systems are generally composed of active components energized by an external power source. PIM occurs in passive elements (which may include cables, antennas etc. forming an antenna network of a communication element) that are subjected to two or more high power tones. The PIM product is the result of the two (or more) high power tones mixing at device nonlinearities such as junctions of dissimilar metals, metal-oxide junctions and even loose connectors. PIM can also be generated in components with manufacturing defects, such as cold or cracked solder joints or poorly made mechanical contacts, or components being defect due to aging. If these defects are exposed to high RF currents, PIM can be generated.

Intermodulation effects, such as PIM, can be compensated in a received signal by means of applying feedback solutions, i.e. by using some kind of echo cancellation. The effectiveness of cancellation, i.e. the compensation result depend on a similarity between a signal used for compensation, also referred to as feedback or reference signal, and a PIM effect in the receive signal, i.e. the component of the signal conveyed on the RX path which is caused e.g. by a PIM source in a connection element.

In narrow band/single standard FDD systems, in some cases, PIM can be dealt with by employing an avoidance strategy, i.e. to place a carrier (i.e. the part of the frequency spectrum used thereby) in an appropriate manner so as to prevent intermodulation receive band hits. However, such an approach is limited with regard to broadband scenarios.

Another approach would be to use high quality material as e.g. silver for coating connectors, cables, jumpers etc. so as to reduce PIM effects. However, this approach results in high manufacturing costs. Furthermore, aging effects within the antenna network caused by humidity, which are causing an increase of PIM and thus are a constant source of problem in a life network, are still present.

FIG. 1 shows a diagram illustrating a part of a transceiver device or element used in a communication scenario where some embodiments and example versions of the disclosure can be applied. Specifically, FIG. 1 shows a diagram illustrating a general configuration of a part of a communication element consisting of (at least one) TX path and (at least one) RX path of e.g. a transceiver element or function which are coupled to a connection element 10, such as a duplexer. The connection element allows a bidirectional communication via an antenna 20 via which a signal conveyed by the TX path can be sent and via which a signaling can be received which is conveyed by the RX path into the communication element.

It is to be noted that the configuration shown in FIG. 1 shows only those devices, parts, connections and links which are useful for understanding principles underlying the examples of embodiments. As also known by those skilled in the art there may be several other elements included in a communication element or transceiver element which are omitted here for the sake of simplicity. Furthermore, even though in FIG. 1 and some of the following figures a configuration is depicted consisting of one TX path and one RX path coupled to a connection element 10 (such as a duplexer), example versions of the disclosure are not limited thereto. Various combinations of one or more TX paths and one or more RX paths (multi-carrier architectures using more than one TX path and/or one or more RX paths) can also be used in a communication element where embodiments and example versions of the disclosure are implemented. Furthermore, even though only one antenna 20 is shown in the figures illustrating example versions of the disclosure, a corresponding communication element may also comprise plural antennas or one or more antenna arrays.

Indicated by a dashed arrow in FIG. 1, a distortion (PIM effect) caused by the TX signaling on the RX signaling is indicated. As indicated in connection with the antenna 20 (i.e. the antenna network) the location where the distortion (i.e. the PIM effect) is caused may be located there (indicated by an "X"), but it is to be noted that there may be more than one location where corresponding distortions (PIM effects) are caused.

According to some embodiments and example versions of the disclosure, a configuration for improving the sensitivity of a receiver is provided which is based on compensating distortions caused by TX signaling, such as PIM intermodulation products, by using a reference signal which is generated or created in a suitable manner. Specifically, according to some example versions of the disclosure, methods, apparatuses, methods and design concepts are provided allowing to create such reference signals in order to attenuate/cancel passive intermodulation products falling into the receive band and having a desensitization effect on the receiver performance. According to some embodiments and example versions of the disclosure, the proposed cancellation method can be applied to a variety of concurrent non-linear passive device induced distortions, such as corroded connections, poor jumper cables etc. since it provides a flexible design and problem-specific adaptation capability. Embodiments of the invention encompass hardware and software based solution capabilities.

Some example versions of the disclosure will be described in connection with FDD based systems.

For example, when considering a single antenna FDD system as indicated in FIG. 1, PIM effect caused by the TX signaling may affect the receiver sensitivity. These intermodulation effects can be derived on the basis of the TX signal. Then, a reference signal is generated on the basis of a model of the intermodulation effects in an appropriate manner. Then the distortion is corrected in a received signal, e.g. by subtracting the reference signal from the received signal including components changing the TX characteristics and caused distortion so as to improve the receiver sensitivity.

Figure 2:
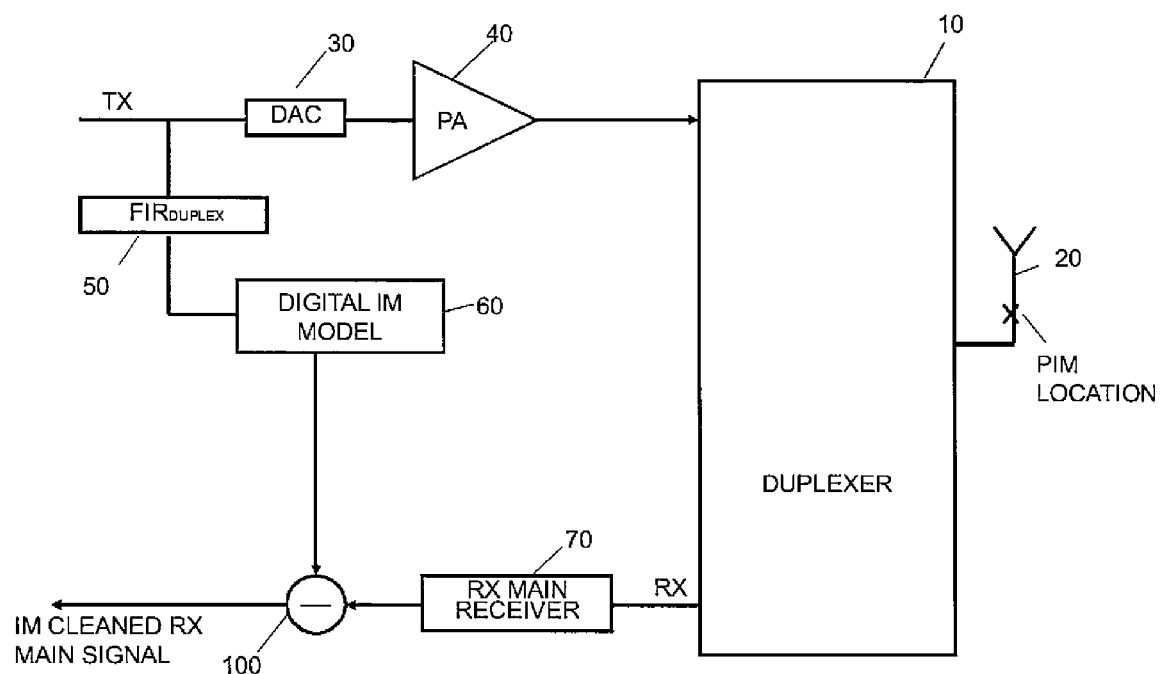
FIG. 2 shows a diagram illustrating details of a configuration of a transceiver system according to some example versions of the disclosure.

FIG. 2 shows a diagram illustrating details of a configuration of a transceiver system as an example of a communication element according to some example versions of the disclosure.

A TX path conveying a signal to be transmitted is coupled to a connection element 10, for example a duplexer 10, so that the signal to be transmitted can be transmitted via an antenna 20. In the TX path, a DAC 30 for converting the signal to be transmitted into an analogue signal and a PA 40 for amplifying the converted signal are connected.

On the other side, an RX path is coupled to the duplexer 10 for conveying a signal being received via the antenna 20. The received signal is supplied to an RX main receiver element 70, wherein processing comprising e.g. filtering, amplifying (by an LNA) and converting into a digital signal by an ADC is conducted in the RX path. The signal output by the RX main receiver 70 is also referred to as an RX main signal. According to the present examples and embodiment, the RX main signal output by the RX main receiver 70 is subjected to distortions caused e.g. by PIM (e.g. in the antenna network as indicated in FIG. 2).

Hence, according to example versions of the disclosure, a reference signal generation entity or processing chain used for providing a correction of the RX main signal is added to the transceiver system.

Specifically, according to the example shown in FIG. 2, the reference for cancellation is appropriately modelled in time and magnitude via a non linear approach directly from the digital TX signal. For this reason, TX data (also referred to as TX) and contemporarily RX main data (also referred to as RXMAIN) are captured and stored in memory.

It is to be noted that in the following description of embodiments and examples the term "capture" data or a signaling is to be understood in such a manner that data or signaling is obtained, got, fed out, caught, branched, detected or the like at a suitable location by suitable means, for example in an antenna network by means of a coupler, in a data path by means of a connector or the like, in a manner that it is suitable for a further processing as described in the following examples and embodiments. The data or signaling being captured may comprise any of analogue or digital data.

In an identification step, model parameters for preparing the reference signal are derived or set so as to reflect the PIM effect.

For example, the identification step may be summarized as a series of different algorithms based on the stored data in memory (i.e. TX and RXMAIN). Corresponding algorithms may be related to the following processes:

1) Non linear modeling of an estimated RX, i.e. RXEST, e.g. in the form of RXEST=f(TX), where f reflects an appropriate non linear model (e.g. $TX^3$) which is modeled in element 60;
2) Delay estimation $\square$ between RXEST and RXMAIN $\square$=delay est(RXEST,RXMAIN), wherein the delay estimation may be based e.g. on a correlation procedure (delay_estimation=correlation);
3) Filter estimation $FIR_{RX}$ for the digital IM model block 60, for example in the form of $FIR_{RX}$=MinimizeEnergy (RXMAIN−RXEST).

According to some example versions and embodiments, further TX distortions may be considered in the generation of the reference signal. For example, it is possible that a duplexer (or a combiner in case more than one TX path is provided) causes further distortions prior to the PIM intermodulation in the antenna network. Therefore, duplexer/combiner characteristics may be determined or predicted so as to obtain further model parameters in addition to model parameters related to the PIM intermodulation in the antenna network depicted in unit 50. The model parameters related to distortions caused by the duplexer/combiner characteristics and the model parameters related to the PIM are then used in a reference signal generation entity or processing chain. Thus, the suppression capability of distortions can be improved in particular for broadband distortions.

The reference signal generation entity or processing chain according to the example in FIG. 2 branches from or is connected to the TX path at a location before the DAC 30 and PA 40 so as to capture the digital TX signal. The reference signal generation entity or processing chain according to the example shown in FIG. 2 comprises a FIR element 50 which is related for example to a distortion effect caused by the duplexer, and a processing element related to a digital IM model 60.

Figure 3:
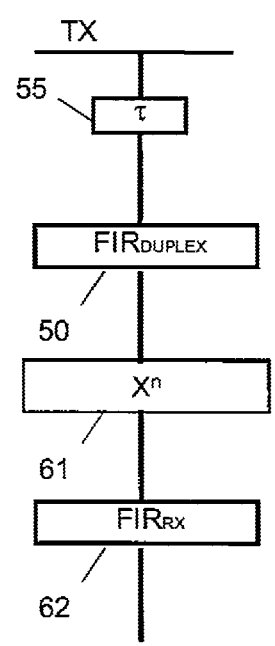
FIG. 3 shows a diagram illustrating details of a processing chain for generating a reference signal according to some example versions of the disclosure.

FIG. 3 shows a more detailed example of a configuration of the reference signal generation entity or processing chain.

When the digital TX signal is captured at a connection point from the TX path, the signal is supplied, after a delay stage 55, to an FIR element 50 (related to the duplexer characteristic) and then to element 61 which applies a model related to the PIM distortion (e.g. x''). The different propagation delay $\square$ of the signal generation entity and the real PIM source(s) is evaluated in the identification process via e.g. correlation. The duplexer characteristic is approximated in element 50 while using a priori measurement data obtained in e.g. final factory procedures.

The output of element 61 is supplied to a further FIR element 62. FIR element 62 is weighting different non linear PIM modeled characteristics in element 61 in phase and magnitude. For example, $FIR_{RX}$ filter characteristics are computed according to best cancellation success. One method is, for example, a so-called least mean square (LMS) approach.

When the reference signal is generated in the digital IM model element 60 (or elements 61, 62), it is supplied to a subtractor 100. Here the RX main signal coming from the RX main receiver 70 is subtracted by the reference signal corresponding to the distortions caused by PIM (and optionally by the duplexer/combiner characteristic). As a result, a RX main signal is supplied to the RX path which is cleaned from the intermodulation products such as PIM without affecting desired incoming UE signals at the transceiver.

The example according to FIGS. 2 and 3 may require high real time processing constraints to a DFE in the transceiver element. However, there is no need for a dedicated RF receiver.

It is to be noted that for FIR filters 50 and/or 62 filter coefficients may be set so as to correspond to the model parameters related to the duplexer characteristic and/or the PIM. Hence, a reference signal is output by the FIR filters which is related to the distortions caused by the TX signal, e.g. PIM.

It is to be noted that according to some example versions of the disclosure, in case of a communication element comprising plural TX paths, each TX path may be provided with a dedicated reference signal generation entity or processing chain as indicated in FIG. 3.

However, deriving and modelling of TX distortions in an antenna combining scenario with different duplexer and combining stages in a life network may be difficult and may require extra measurement effort.

Figure 4:
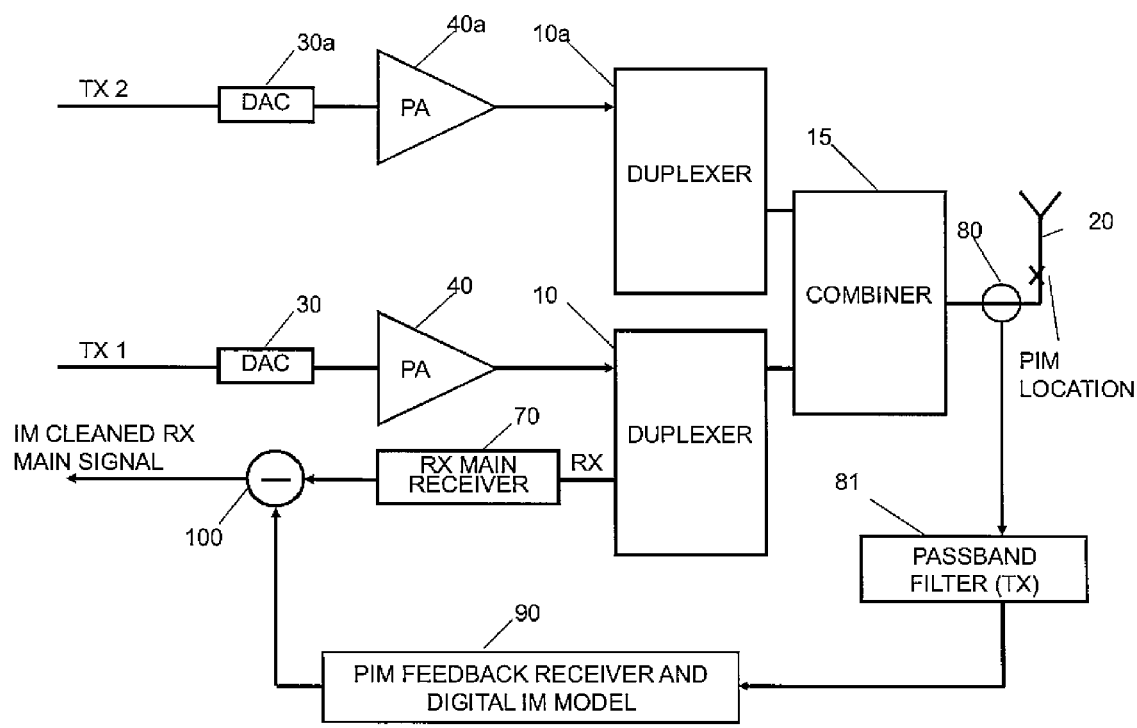
FIG. 4 shows a diagram illustrating details of a configuration of a transceiver system according to some further example versions of the disclosure.
Figure 5:
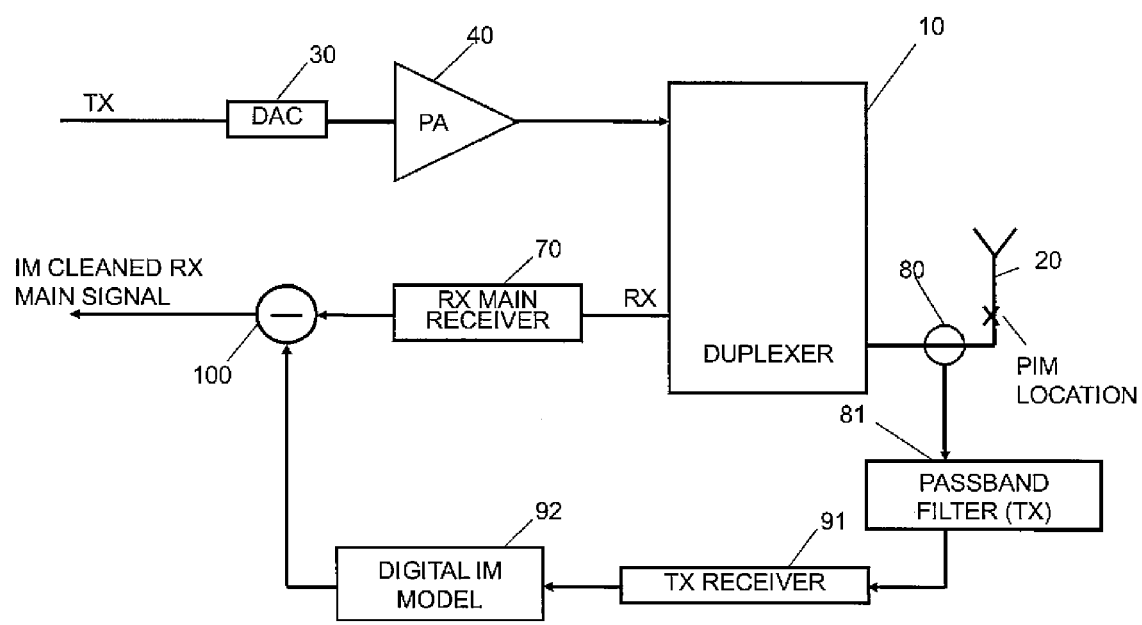
FIG. 5 shows a diagram illustrating details of a configuration of a transceiver system according to some further example versions of the disclosure.
Figure 6:
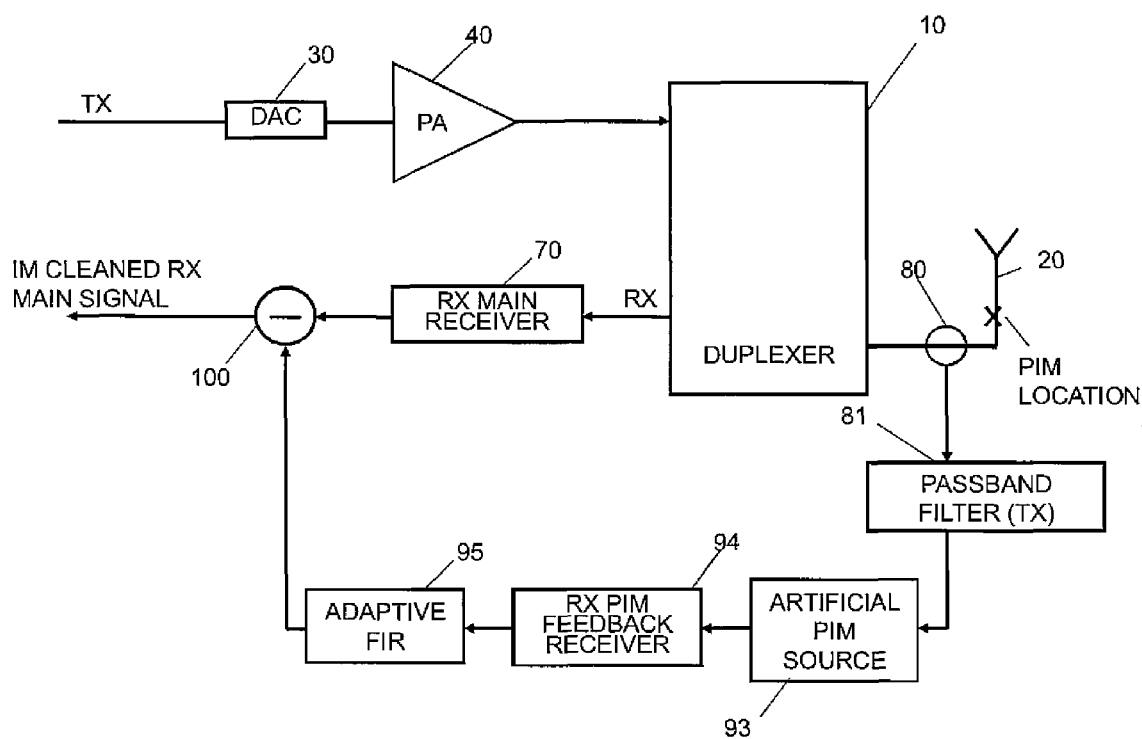
FIG. 6 shows a diagram illustrating details of a configuration of a transceiver system according to some further example versions of the disclosure.

Therefore, according to a further embodiment or example version of the disclosure, as indicated in FIGS. 4 to 6, another configuration for improving the receiver sensitivity is provided.

According to the embodiment of FIG. 4, which represents an overview of the general configuration of the present example and embodiment, a combined analogue broadband TX signal is captured after the last combining stage and used as an input for reference signal generation element or processing chain. The captured analogue broadband TX signal contains already any TX distortions caused in the TX chain prior to PIM appearance, for example. Sources for such distortions are, for example, duplexers and combiner.

In the diagram illustrated in FIG. 4, details of a configuration of a transceiver system as a further example of a communication element according to some further embodiments or example versions of the disclosure is shown.

A first TX path (TX1) conveying a signal to be transmitted is coupled to a first connection element 10, for example a duplexer 10, so that the signal to be transmitted can be transmitted via antenna 20. In the first TX path, a DAC 30 for converting the signal to be transmitted into an analogue signal and a PA 40 for amplifying the converted signal are connected. Furthermore, a second TX path (TX2) conveying a signal to be transmitted is coupled to a second connection element 10a, for example a duplexer 10a, so that the signal to be transmitted can be transmitted via antenna 20. In the second TX path, a DAC 30a for converting the signal to be transmitted into an analogue signal and a PA 40a for amplifying the converted signal are connected. Outputs of the duplexers 10 and 10a are coupled to a combiner 15 which provides the link to the antenna 20, i.e. which functions as an antenna combiner.

For example, the first TX path TX1 may be related to a first frequency band (e.g. LTE Band 8, 900 MHz), while the second TX path TX2 may be related to a second frequency band (e.g. LTE Band 20, 800 MHz).

It is to be noted that group delay properties/characteristics of the duplexers 10 and 10a as well as the combiner 15 cause TX distortions prior to PIM which, according to some examples and embodiments, are taken into model consideration in order to improve the cancellation success. This is given while branching off the reference signal in element 80 (described below).

On the other side, an RX path is coupled to the duplexer 10 for conveying a signal being received via the antenna 20. The received signal is supplied to an RX main receiver element 70, wherein processing comprising e.g. filtering, amplifying (by an LNA) and converting into a digital signal by an ADC is conducted in the RX path. The signal output by the RX main receiver 70 is referred to as an RX main signal. According to the present examples and embodiment, the RX main signal output by the RX main receiver 70 is subjected to distortions caused e.g. by PIM (e.g. in the antenna network as indicated in FIG. 4).

According to example versions of the disclosure, a reference signal generation entity or processing chain used for providing a correction of the RX main signal is connected in the transceiver system as described below.

At a coupler element 80, the combined analogue broadband TX signal is captured after the last combining stage (i.e. combiner 15). It is to be noted that TX and RX data being captured may be stored in a memory.

The captured TX signal is input to a passband filter element 81 which is set in such a manner that only the TX component of the captured signal is supplied (i.e. RX components are blocked). The filtered signaling (combined analogue broadband TX signal) is supplied to a reference signal generation element or processing chain comprising a PIM feedback receiver and digital modeling element 90. As indicated above, the captured analogue broadband TX signal contains already any TX distortions caused in the TX chain e.g. by the duplexer/combiner characteristics. In the PIM feedback receiver and digital modeling element 90, the reference signal is generated and output to the subtractor 100. Examples of procedures for generating the reference signal are further explained below with regard to FIGS. 5 and 6, for example.

It is to be noted that a feedback to every transceiver within a radio frequency module (RFM) or remote radio head (RRH) is provided e.g. via a separate reference signal generation element or processing chain.

Then, the reference signal generated in the PIM feedback receiver and digital modeling element 90 and supplied to the subtractor 100 is subtracted from the RX main signal coming from the RX main receiver 70. As a result, a RX main signal is supplied to the RX path which is cleaned from the intermodulation products such as the PIM.

FIG. 5 shows a diagram illustrating details of a configuration of a transceiver system according to some further example versions of the disclosure, which is based on the configuration according to FIG. 4.

It is to be noted that FIG. 5 shows only one TX path (e.g. path TX1). However, the configuration shown in FIG. 5 may be applicable to a structure as indicated in FIG. 4 plural TX paths. Furthermore, measures for capturing and delay compensation are not depicted for simplicity reasons.

In detail, as indicated in FIG. 5, the captured signal is supplied from the coupler 80 via the passband filter 81 to a broadband TX feedback receiver 91. The TX feedback receiver 91 comprises, for example, elements like filters, an ADC stage etc.

After the ADC stage of the TX feedback receiver 91, a digital multicarrier TX signal from different or same transmitter stages is output and used as an input data stream (TX_in) for a non-linear DFE/processing device 92 acting as the processing element for the digital IM model. The non-linear DFE/processing device 92 outputs a continuous reference data stream matching the RX distortions which can hence be subtracted from the RX main stream at the subtractor 100. It is to be noted that model parameters used in the non-linear DFE/processing device 92 are retrieved, for example, by means of an identification step. This identification step may be summarized as a series of different algorithms based on the stored data (TX, RXMAIN) in the memory. Corresponding algorithms may be related to the following processes:

1) Non linear modeling of estimated RX, i.e. RXEST, e.g. in the form of RXEST=f(TX), where f reflects an appropriate non linear model (e.g. $TX^3$), which is modeled in element 92;
2) Delay estimation $\Box$ between RXEST and RXMAIN $\Box$=delay est(RXEST,RXMAIN), wherein the delay estimation may be based e.g. on a correlation procedure, (delay_estimation=correlation);
3) Filter estimation $FIR_{RX}$ for the digital IM model block 92, for example in the form of $FIR_{RX}$=MinimizeEnergy (RXMAIN−RXEST).

It is to be noted that the configuration according to FIG. 5 may be complex from DFE and RF HW point of view, but it allows maximum PIM suppression performance and is applicable for multiband use cases.

FIG. 6 shows a diagram illustrating details of another configuration of a transceiver system according to some further example versions of the disclosure, which is based on the configuration according to FIG. 4.

It is to be noted that FIG. 6 shows only one TX path (e.g. path TX1). However, the configuration shown in FIG. 6 may be applicable to a structure as indicated in FIG. 4 comprising plural TX paths. Furthermore, measures for capturing and delay compensation are not depicted for simplicity reasons.

In detail, as indicated in FIG. 6, the captured signal is supplied from the coupler 80 via the passband filter 81 to a non-linear analogue circuitry or device 93 acting as an artificial PIM source. Examples for such a non linear analogue circuitry comprise various suitable devices, such as a tunable diode, a mixing stage, an analogue multiplier circuitry etc. The purpose of the non-linear analogue circuitry or device 93 is to emulate or reproduce the PIM effect as it happens e.g. in the antenna network or the like (cable connector, etc.) thus omitting the digital non linear block 61. The artificial PIM source characteristic of the element 93 is tunable, as indicated e.g. in FIG. 7, which represents one possible example of a characteristic of the PIM source. The resulting signal is fed into an added RX PIM feedback receiver 94. The feedback receiver may have a similar characteristic like the RX main receiver 70. For example, the RX PIM feedback receiver 94 comprises, for example, elements like filters, an ADC stage etc.

An output of the RX feedback receiver 94 (after an ADC stage thereof) is supplied to a processing device 95, such as an adaptive FIR element matching in phase and magnitude with a desired reference signal with RXMAIN distortions. The processing device 95 outputs a continuous reference data stream which can be subtracted from the RX main stream at the subtractor 100. It is to be noted that model parameters used in the processing device 95 are retrieved, for example, by means of an identification step. This identification step may be less complex that an identification step required e.g. in connection with a configuration according to FIG. 5. For example, one reason for being less complex is that the non linear model is already given by the hardware block 93. Thus, algorithms used in the present identification step may be distinguished by:

1) Delay estimation $\Box$ between RXEST (output of element 94) and RXMAIN $\Box$=delay est(RXEST,RXMAIN), wherein the delay estimation may be based e.g. on a correlation procedure (delay_estimation=correlation);

2) Filter estimation $FIR_{RX}$ for the element 95, for example in the form of $FIR_{RX}$=MinimizeEnergy(RXMAIN−RXEST)

It is to be noted that according to the configuration indicated in FIG. 6, the performance requirement for the DFE/processing stage (i.e. processing device 95) after the ADC stage of the RX feedback receiver 94 may be reduced. This depends, for example, on a matching degree between the artificial PIM source (i.e. the non-linear analogue circuitry or device 93) to the PIM load characteristic. The matching degree may be set, for example, by tuning the non-linear analogue circuitry 93 characteristic according to the needs.

Figure 7:
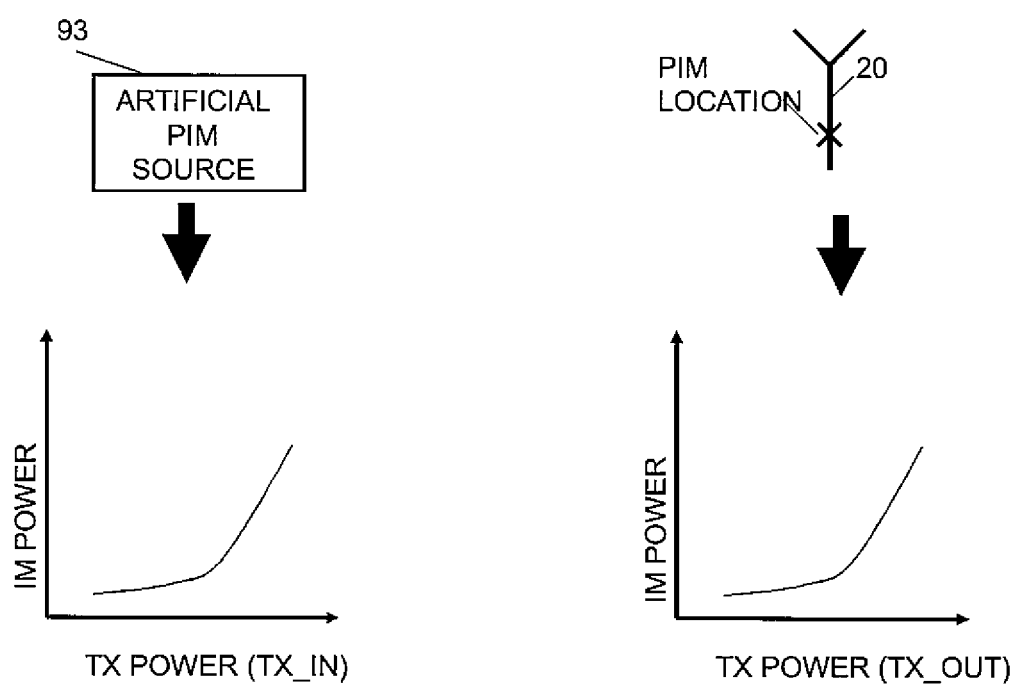
FIG. 7 shows diagrams illustrating a dynamic gain matching according to an example version of the disclosure.

This dynamic gain matching is illustrated in FIG. 7 according to an example version of the disclosure. The left side diagram illustrates a relationship between the TX power and the IM power of the artificial PIM source (the non-linear analogue circuitry or device 93) emulating or reproducing the PIM effect, while the right side diagram illustrates a relationship between the TX power and the IM power of the actual PIM source e.g. at the antenna network (PIM load characteristic). In the case illustrated in FIG. 7, it is assumed that the PIM power dependencies of the antenna are properly approximated by the non linear analogue circuitry (dynamic gain matching).

According to the configuration described in connection with FIGS. 6 and 7, it is possible to decrease the overall complexity of the processing. For example, it is only necessary to cover a bandwidth corresponding to the receiver bandwidth (e.g. 75 MHz) instead of several TX bandwidths. Furthermore, the complexity of the processing device 95 may be decreased. In this context, however, it is to be noted that in case the analog dynamic gain matching achieved by the non-linear analogue circuitry or device 93 is not sufficient for specific use cases, the complexity of the digital model connected afterwards (i.e. of the processing device 95) may be increased.

The above described embodiments and example versions of the disclosure illustrating configurations used for improving a receiver sensitivity by applying distortion cancellation methods are described to be applied with a TX induced passive intermodulation distortion. However, it is to be noted that the principles described above can be applied also to a variety of other distortion types. Furthermore, it is to be noted that the mechanisms described in connection with FIGS. 2 to 6 are applicable by HW and/or SW.

In addition, the concepts described in connection with the embodiments and example versions of the disclosure according to FIGS. 2 to 6 can be used in radio designs to cope with unwanted PIM signals affecting receiver sensitivity degradations in particular in radio products where antenna network components are aging over time, wherein in particular broadband radio applications benefit from effects of the embodiments and example versions of the disclosure. Furthermore, one design advantage is the option to clean only affected receive channels rather than to use an approach where it is required to suppress the entire intermodulation products. Thus, the complexity can be kept low while still proper suppression results are achievable. In addition, it is to be noted that the UL antenna signal (i.e. the signal at the antenna 20) coming from the UE is completely unaffected by the compensation/correction procedures according to example versions of the disclosure. Hence, a PIM cancellation capacity is provided allowing simpler and cost optimized RF products.

It is to be noted that embodiments and examples as described in connection with FIGS. 2 to 6 are different with regard to a level of microprocessor support and real time constraints.

Embodiments and examples as described in connection with FIG. 2 and FIG. 3 comprises the highest level of DFE/microprocessor support and real time constraints but omits completely the need for any RF feedback receiver. For example, it is possible to implement the configuration according to the embodiment of FIGS. 2 and 3 as a plain digital solution which is useful, for example, for an ASIC solution. In case the TX signal distortions caused by e.g. duplexer is taken into consideration, the efficiency of the direct modeling approach is in particular efficient.

Embodiments and examples as described in connection with FIG. 4 and FIG. 5 are powerful and flexible solution in terms of PIM cancellation performance. This requires a high complexity, for example due to sample rates in the TX feedback receiver. The DFE/microprocessor support is high. The configuration according to this embodiment allows that even complex architectures comprising e.g. antenna combining schemes which possibly cause PIM can be cleaned.

Embodiments and examples as described in connection with FIG. 4 and FIG. 6 introduce an adjustable PIM source circuitry prior to an RX receiver. If the dynamic gain matching with the PIM source in the antenna network can be tuned (as indicated in FIG. 7), the DFE/microprocessor support can be further minimized. The overall correction gain can be assumed to be sufficient for practical requirements. Furthermore, a reduced sampling rate compared to other embodiments (such as that described in connection with FIG. 5) is applicable allowing cost savings because sample rates have to cover only PIM affected RX bands and not e.g. several TX bands (as in an antenna combining example).

Figure 8:
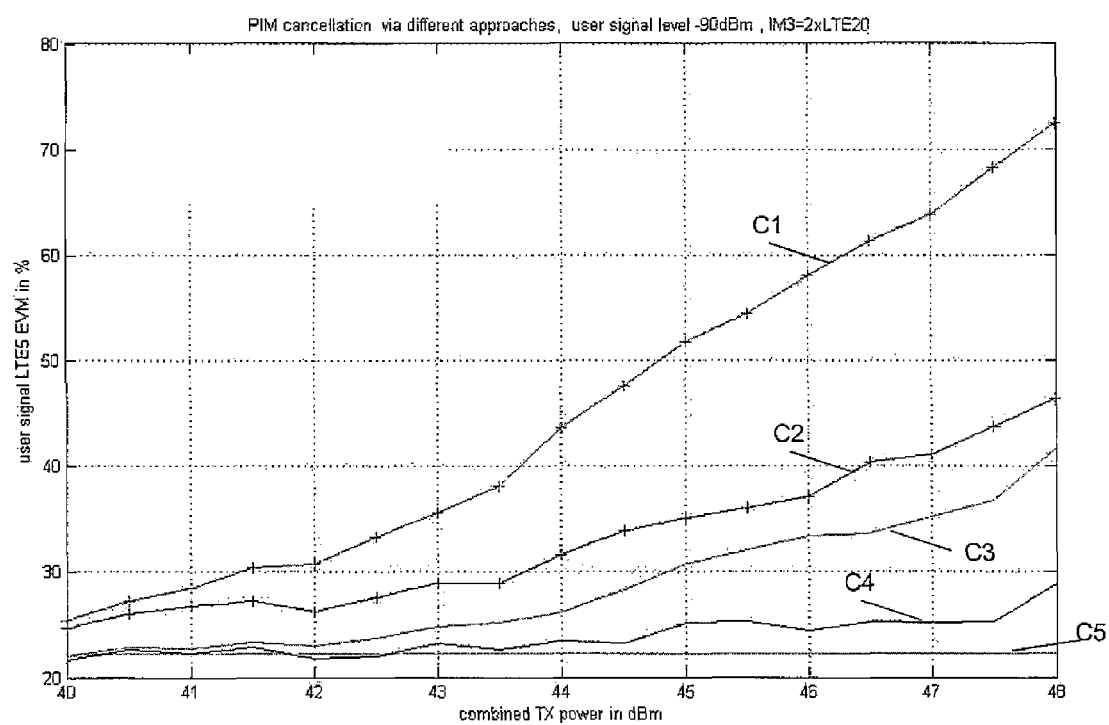
FIG. 8 shows a diagram illustrating effects of example versions of the disclosure.

In the following, effects of embodiments and example versions of the disclosure according to the configurations described in connection with FIGS. 2 to 6 for improving the receiver sensitivity are explained in connection with FIG. 8. FIG. 8 shows a diagram illustrating effects of example versions of the disclosure, in particular a comparison of PIM cancellation results for a UE carrier (e.g. LTE5).

As described above, embodiments and example versions according to FIGS. 2 to 6 may vary with regard to requirements for hardware, costs and achievable improvement for the RX sensitivity. In FIG. 8, measured and simulated results for the different configurations and methods of a corresponding PIM cancellation capacity are illustrated. The results are expressed as EVM for an LTE5 UE signal in % over a combined TX power in dBm, wherein a user signal level of −90 dBm is assumed. It is to be noted that the values for EVM indicated in FIG. 8 are only examples for illustrating a possible effect also in relation between the respective examples. Actually achieved values may of course be different.

Specifically, in FIG. 8, a curve C1 is related to an uncorrected LIES signal. A curve C2 is related to an implementation example according to FIG. 6. A curve C3 is related to an implementation example according to FIG. 2 (without considering a duplexer characteristic). A curve C4 is related to an implementation example according to FIG. 4 or according to FIG. 2 (considering a duplexer characteristic). Curve C5 is related to a reference EVM (TX=off).

As can be derived from FIG. 8, compared to the uncorrected signaling, the configuration according to FIG. 6 provides sufficient performance with regard to PIM cancellation. The configurations according to FIGS. 2 and 5 may further increase the performance.

Thus, an improvement of the receiver sensitivity is achievable by each of the described example versions of the disclosure.

Figure 9:
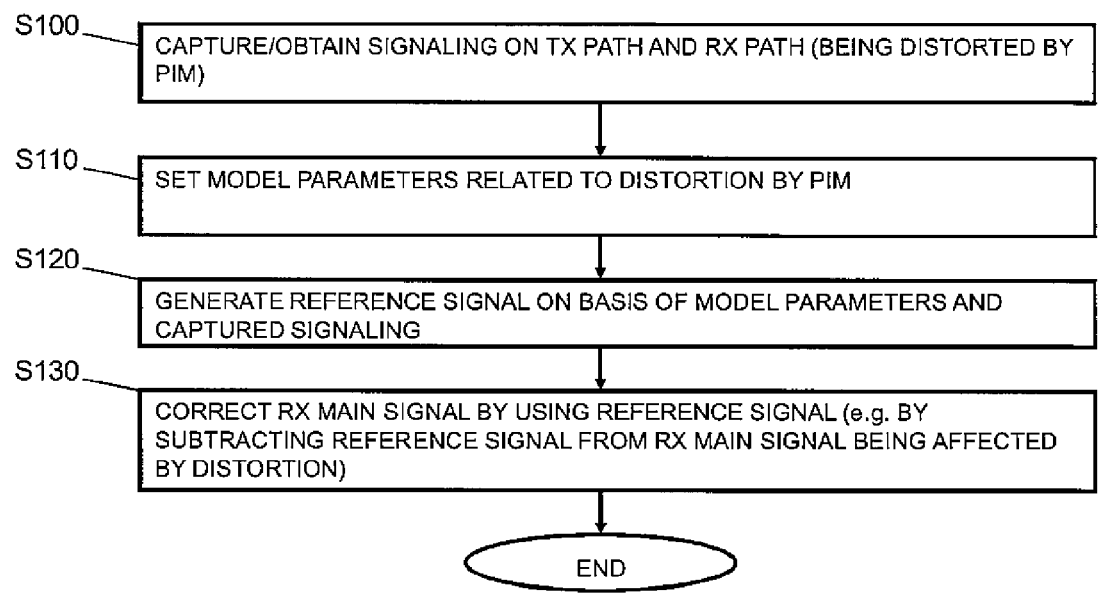
FIG. 9 shows a flow chart illustrating a processing according to some example versions of the disclosure.

FIG. 9 shows a flow chart of a processing conducted in a transceiver element according to some embodiments and example versions of the disclosure. In detail, a processing flow is shown corresponding to a procedure executed in a communication element in which embodiments and example versions of the disclosure for improving the receiver sensitivity are executed, for example in accordance with a configuration as depicted in any of FIGS. 2 to 6, wherein a HW and/or SW based configuration may be used.

In S100, a signaling on a transmission path conveying a signal to be transmitted and on a reception path conveying a signal being received is captured.

Then, in S110, model parameters related to a distortion effect are set on the basis of the captured signaling. The distortion effect is caused, for example, by the signal to be transmitted on the signal being received due to passive intermodulation between the transmission path and the reception path.

In S120, a reference signal being related to a predetermined frequency spectrum part used by the signal being received is generated by applying the model parameters on a captured signaling on the transmission path.

For example, according to some embodiments, in S100, a part of the captured signaling which is used for setting the model parameters is captured as digital data conveyed in the transmission path before a digital-to-analog conversion and a power amplification of the signal to be transmitted are conducted (corresponding e.g. to the configuration according to FIG. 2). In this case, in S110, the setting of the model parameters further comprises conducting an identifying process for deriving the model parameters determining a non-linear modeling. Then, the reference signal is generated in S120 on the basis of the derived model parameters related to the passive intermodulation in time and magnitude via a FIR filter.

According to some further examples, in connection with S110 and S120, the setting of the model parameters may further comprise conducting an identifying process for deriving the model parameters related to a distortion effect being caused by the signal to be transmitted on the signal being received due to a characteristic of a connection element including at least one of a duplexer or combiner. In this case, in S120, the reference signal is generated on the basis of the derived model parameters related to the passive intermodulation and to the characteristic of the connection element in time and magnitude via a respective finite impulse response filter.

According to another example, in S100, a part of the captured signaling which is used for setting the model parameters is captured as analogue data conveyed in the transmission path after a digital-to-analog conversion and a power amplification of the signal to be transmitted are conducted (corresponding e.g. the configuration according to FIG. 4 and FIG. 5), wherein the analogue data are subjected to the distortion effect.

Then, the captured signaling is supplied to a radio frequency feedback receiver, and the output of the radio frequency feedback receiver is supplied to a non-linear processing element for generating the reference signal. The processing of the non-linear processing element is based on the set model parameters, wherein the setting of the model parameters comprises conducting an identifying process for deriving the model parameters determining a non-linear modeling.

According to still another example, in S100, a part of the captured signaling which is used for setting the model parameters is captured as analogue data conveyed in the transmission path after a digital-to-analog conversion and a power amplification of the signal to be transmitted are conducted (corresponding e.g. the configuration according to FIG. 4 and FIG. 6), wherein the analogue data are subjected to the distortion effect.

Then, the captured signaling is supplied to an artificial passive intermodulation source emulating the distortion effect. According to some example, the artificial passive intermodulation source is an adjustable non-linear analogue circuit having a characteristic allowing a dynamic gain matching with a source of the distortion effect.

Then, the output of the artificial passive intermodulation source is supplied to a radio frequency feedback receiver (which may be similar to a main receiver), and the output of the radio frequency feedback receiver is supplied to processing element for generating the reference signal. The processing of the processing element may be based on the set model parameters.

It is to be noted that in the above examples, when plural transmission paths are provided (see e.g. FIG. 4), the signaling is a combined analogue transmission signal being captured after a combining stage combining the plural transmission paths.

In S130, the signal being received is corrected by using the generated reference signal. The correction of the signal being received includes, for example, a subtraction processing of the reference signal from a main reception signal being affected by the distortion effect.

It is to be noted that according to examples and embodiments, procedures according to the process flow from S100 to S130 are repeated in a cyclic manner so as to update constantly the parameters.

Figure 10:
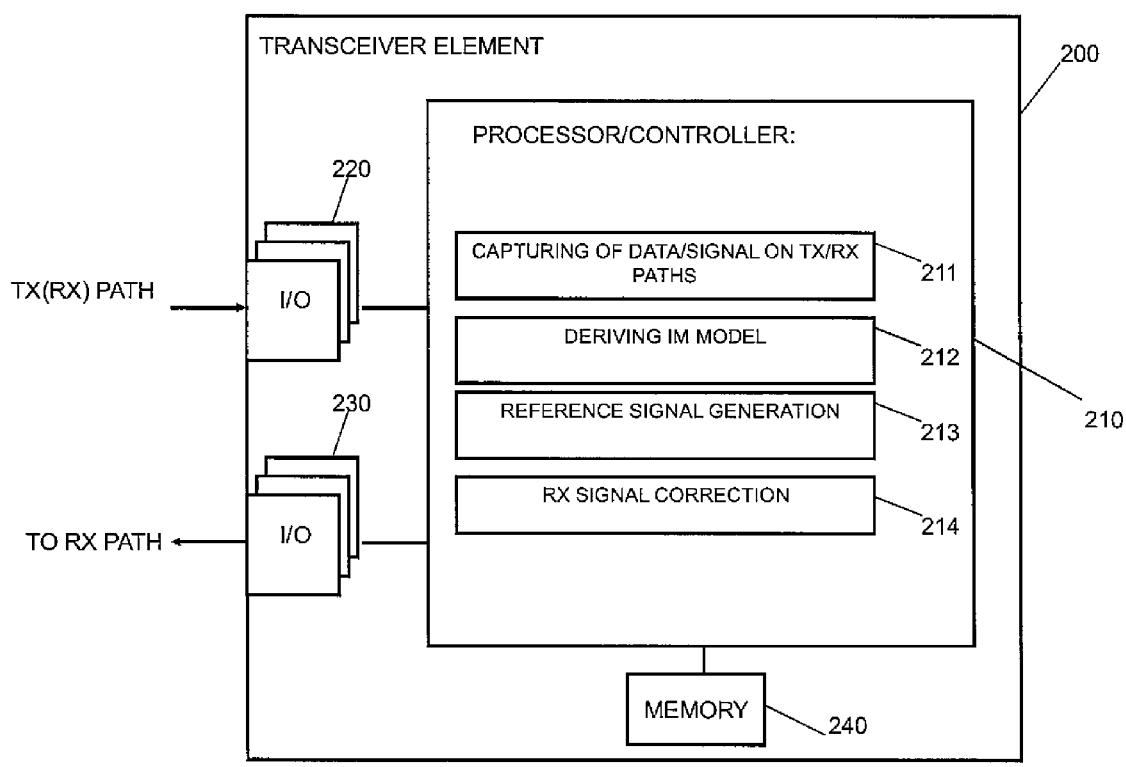
FIG. 10 shows a diagram of a device usable in a transceiver element including processing portions conducting functions according to some example versions of the disclosure.

FIG. 10 shows a diagram of a configuration of a communication element part, such as a part of a transceiver element, including processing portions conducting functions according to some example versions of the disclosure. Specifically, FIG. 10 shows a diagram illustrating a configuration of an apparatus being connectable or applicable to a communication element like a transceiver element, which is configured to implement the procedure for improving the receiver sensitivity as described in connection with some example versions of the disclosure. It is to be noted that the apparatus shown in FIG. 10 may comprise further elements or functions besides those described herein below which are related to other transmitting or receiving functionalities, for example. Furthermore, even though reference is made to a transceiver, the communication element may be also another device having a similar function, including also a chipset, a chip, a module etc., which can also be part of a communication element or attached as a separate element to a communication element, or the like. It should be understood that each block and any combination thereof may be implemented by various means or their combinations, such as hardware, software, firmware, one or more processors and/or circuitry.

The part of the communication element 200 shown in FIG. 10 may comprise a processing function, control unit or processor 210, such as a CPU or the like, which is suitable for executing instructions given by programs or the like related to a communication procedure. The processor 210 may comprise one or more processing portions dedicated to specific processing as described below, or the processing may be run in a single processor. Portions for executing such specific processing may be also provided as discrete elements or within one or more processors or processing portions, such as in one physical processor like a CPU or in several physical entities, for example. Reference signs 220 and 230 denote input/output (I/O) units (interfaces) connected to the processor 210. The I/O units 220 may be used for forming a coupling or link to one or more communication lines forming a respective TX chain, wherein one or both of digital data and analog data (after DAC) can be scanned. The I/O units 230 may be used for forming a coupling or link to one or more communication lines forming a respective RX path. Reference sign 240 denotes a memory usable, for example, for storing data and programs to be executed by the processor 210 and/or as a working storage of the processor 210.

The processor 210 is configured to execute processing related to the above described communication procedure. In particular, the processor 210 may comprise a sub-portion 211 as a processing portion which is usable for capturing data. The portion 211 may be configured to perform processing according to S100 of FIG. 9. Moreover, the processor 210 may comprise a sub-portion 212 as a processing portion which is usable for deriving a model (i.e. setting model parameters) for generating a reference signal. The portion 212 may be configured to perform processing according to S110 of FIG. 9. Furthermore, the processor 210 may comprise a sub-portion 213 usable as a portion for generating a reference signal by using the model. The portion 213 may be configured to perform processing according to S120 of FIG. 9. Furthermore, the processor 210 may comprise a sub-portion 214 usable as a portion for conducting an RX signal correction. The portion 214 may be configured to perform a processing according to S130 of FIG. 9.

According to a further example versions of the disclosure, there is provided an apparatus comprising means for capturing a signaling on a transmission path conveying a signal to be transmitted and on a reception path conveying a signal being received, means for setting model parameters related to a distortion effect on the basis of the captured signaling, the distortion effect being caused by the signal to be transmitted on the signal being received due to passive intermodulation between the transmission path and the reception path, means for generating a reference signal being related to a predetermined frequency spectrum part used by the signal being received by applying the model parameters on a captured signaling on the transmission path, and means for correcting the signal being received by using the generated reference signal.

Furthermore, according to additional example versions of the disclosure, there are provided the following aspects:

According to an aspect A, there is provided an apparatus comprising at least one processor, and at least one memory for storing instructions to be executed by the processor, wherein the at least one memory and the instructions are configured to, with the at least one processor, cause the apparatus at least: to capture a signaling on a transmission path conveying a signal to be transmitted and on a reception path conveying a signal being received, to set model parameters related to a distortion effect on the basis of the captured signaling, the distortion effect being caused by the signal to be transmitted on the signal being received due to passive intermodulation between the transmission path and the reception path, to generate a reference signal being related to a predetermined frequency spectrum part used by the signal being received by applying the model parameters on a captured signaling on the transmission path, and to correct the signal being received by using the generated reference signal.

According to an aspect A1, in the apparatus according to aspect A, the at least one memory and the instructions are further configured to, with the at least one processor, cause the apparatus at least to conduct for correcting of the signal being received a subtraction processing of the reference signal from a main reception signal being affected by the distortion effect.

According to an aspect A2, in the apparatus according to aspect A or aspect A1, the at least one memory and the instructions are further configured to, with the at least one processor, cause the apparatus at least to capture a part of the captured signaling which is used for setting the model parameters as digital data conveyed in the transmission path before a digital-to-analog conversion and a power amplification of the signal to be transmitted are conducted, and to set the model parameters by conducting an identifying process for deriving the model parameters determining a non-linear modelling, wherein the reference signal is generated on the basis of the derived model parameters related to the passive intermodulation in time and magnitude via a finite impulse response filter.

According to an aspect A3, in the apparatus according to aspect A2, the at least one memory and the instructions are further configured to, with the at least one processor, cause the apparatus at least to set the model parameters by conducting an identifying process for deriving the model parameters related to a distortion effect being caused by the signal to be transmitted on the signal being received due to a characteristic of a connection element including at least one of a duplexer or combiner, wherein the reference signal is generated on the basis of the derived model parameters related to the passive intermodulation and to the characteristic of the connection element in time and magnitude via a respective finite impulse response filter.

According to an aspect A4, in the apparatus according to aspect A or A1, the at least one memory and the instructions are further configured to, with the at least one processor, cause the apparatus at least to capture a part of the captured signaling which is used for setting the model parameters as analogue data conveyed in the transmission path after a digital-to-analog conversion and a power amplification of the signal to be transmitted are conducted, wherein the analogue data are subjected to the distortion effect, to supply the captured signaling to a radio frequency feedback receiver, to supply the output of the radio frequency feedback receiver to a non-linear processing element for generating the reference signal, wherein the processing of the non-linear processing element is based on the set model parameters, wherein the setting of the model parameters comprises conducting an identifying process for deriving the model parameters determining a non-linear modelling.

According to an aspect A5, in the apparatus according to aspect A or A1, the at least one memory and the instructions are further configured to, with the at least one processor, cause the apparatus at least to capture a part of the captured signaling which is used for setting the model parameters as analogue data conveyed in the transmission path after a digital-to-analog conversion and a power amplification of the signal to be transmitted are conducted, wherein the analogue data are subjected to the distortion effect, to supply the captured signaling to an artificial passive intermodulation source emulating the distortion effect, to supply the output of the artificial passive intermodulation source to a radio frequency feedback receiver, to supply the output of the radio frequency feedback receiver to a processing element for generating the reference signal, wherein the processing of the processing element is based on the set model parameters.

According to an aspect A6, in the apparatus according to aspect A5, the artificial passive intermodulation source is an adjustable non-linear analogue circuit having a characteristic allowing a dynamic gain matching with a source of the distortion effect.

According to an aspect A7, in the apparatus according to any of aspects A4 to A6, in case plural transmission paths are provided, the signaling is a combined analogue transmission signal being captured after a combining stage combining the plural transmission paths.

According to an aspect A8, the apparatus according to any of aspects A to A7 is comprised in a transceiver entity comprising at least one antenna, at least one transmission path and at least one reception path.

According to an aspect B, there is provided an apparatus comprising a link to at least one transmission path for conveying a signal to be transmitted, a link to at least one reception path for conveying a signal being received, a data capturing unit configured to capture a signaling on a transmission path conveying a signal to be transmitted and on a reception path conveying a signal being received, a reference signal generation unit configured to set model parameters related to a distortion effect on the basis of the captured signaling, the distortion effect being caused by the signal to be transmitted on the signal being received due to passive intermodulation between the transmission path and the reception path, and to generate a reference signal being related to a predetermined frequency spectrum part used by the signal being received by applying the model parameters on a captured signaling on the transmission path, and a correction unit configured to correct the signal being received by using the generated reference signal.

According to an aspect B1, in the apparatus according to aspect B, the correction unit includes a subtraction processing unit connected to the at least one reception path, the subtraction processing unit being configured to subtract the reference signal from the signal being received which is affected by the distortion effect.

According to an aspect B2, in the apparatus according to aspect B or B1, the reference signal generation unit further comprises a connection to at least one transmission path conveying the signaling to be captured which is used for setting the model parameters as digital data before a digital-to-analog conversion and a power amplification of the signal to be transmitted are conducted, a finite impulse response filter to which the captured signaling is supplied, wherein the model parameters are set by conducting an identifying process for deriving the model parameters determining a non-linear modelling, and the reference signal is generated on the basis of the derived model parameters related to the passive intermodulation in time and magnitude via the finite impulse response filter.

According to an aspect B3, in the apparatus according to aspect B2, the reference signal generation unit further comprises a further finite impulse response filter to which the captured signaling is supplied, wherein the reference signal generation unit is further configured to conduct an identifying process for deriving model parameters related to a distortion effect being caused by the signal to be transmitted on the signal being received due to a characteristic of a connection element including at least one of a duplexer or combiner, wherein the reference signal is generated on the basis of the derived model parameters related to the passive intermodulation and to the characteristic of the connection element in time and magnitude via a respective finite impulse response filter.

According to an aspect B4, in the apparatus according to aspect B or B1, the reference signal generation device further comprises a connection to at least one transmission path conveying the signaling to be captured which is used for setting the model parameters as analogue data after a digital-to-analog conversion and a power amplification of the signal to be transmitted are conducted, wherein the analogue data are subjected to the distortion effect, a radio frequency feedback receiver to which the captured signaling is supplied, and a non-linear processing element to which the output of the radio frequency feedback receiver is supplied for generating the reference signal, wherein the processing of the non-linear processing element is based on the set model parameters, wherein the model parameters are set on the basis of an identifying process deriving the model parameters determining a non-linear modelling.

According to an aspect B5, in the apparatus according to aspect B or B1, the reference signal generation device further comprises a connection to at least one transmission path conveying the signaling to be captured which is used for setting the model parameters as analogue data after a digital-to-analog conversion and a power amplification of the signal to be transmitted are conducted, wherein the analogue data are subjected to the distortion effect, an artificial passive intermodulation source emulating the distortion effect, to which the captured signaling is supplied, a radio frequency feedback receiver to which an output of the artificial passive intermodulation source is supplied, and a processing element to which an output of the radio frequency feedback receiver is supplied for generating the reference signal, wherein the processing of the non-linear processing element is based on the set model parameters.

According to an aspect B6, in the apparatus according to aspect B5, the artificial passive intermodulation source is an adjustable non-linear analogue circuit having a characteristic allowing a dynamic gain matching with a source of the distortion effect.

According to an aspect B7, in the apparatus according to any of aspects B4 to B6, in case plural transmission paths are provided, the connection to the at least one transmission path is established at a location where a signaling is a combined analogue transmission signal after a combining stage combining the plural transmission paths.

According to an aspect B8, the apparatus according to any of aspects B to B7 is comprised in a transceiver entity comprising at least one antenna, at least one transmission path and at least one reception path.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (FDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor are software code independent and can be specified using any known or future developed programming language, such as a high-level programming language, such as objective-C, C, C++, C#, Java, etc., or a low-level programming language, such as a machine language, or an assembler, —implementation of embodiments, is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus comprising:
a link to at least one transmission path for conveying a signal to be transmitted;
a link to at least one reception path for conveying a signal being received;
a data capturing unit configured to capture a signaling on a transmission path conveying a signal to be transmitted and on a reception path conveying a signal being received;
a reference signal generation unit configured to set model parameters related to a distortion effect on the basis of the captured signaling, the distortion effect being caused by the signal to be transmitted on the signal being received due to passive intermodulation between the transmission path and the reception path, and to generate a reference signal being related to a predetermined frequency spectrum part used by the signal being received by applying the model parameters on a captured signaling on the transmission path; and
a correction unit configured to correct the signal being received by using the generated reference signal.

* * * * *